US009803995B2

(12) United States Patent
Okita et al.

(10) Patent No.: US 9,803,995 B2
(45) Date of Patent: Oct. 31, 2017

(54) FIELD DEVICE

(71) Applicant: YOKOGAWA ELECTRIC CORPORATION, Musashino-shi, Tokyo (JP)

(72) Inventors: Hironori Okita, Musashino (JP); Izumi Koga, Musashino (JP); Takayasu Itou, Musashino (JP); Masaaki Inatomi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 125 days.

(21) Appl. No.: 14/879,314

(22) Filed: Oct. 9, 2015

(65) Prior Publication Data

US 2016/0109313 A1 Apr. 21, 2016

(30) Foreign Application Priority Data

Oct. 15, 2014 (JP) .................. 2014-210652

(51) Int. Cl.
| | | |
|---|---|---|
| *G08C 19/02* | (2006.01) | |
| *G08C 19/16* | (2006.01) | |
| *G01L 9/00* | (2006.01) | |
| *G01D 3/10* | (2006.01) | |
| *H04Q 9/00* | (2006.01) | |

(52) U.S. Cl.
CPC ............. *G01D 3/10* (2013.01); *G08C 19/02* (2013.01); *H04Q 9/00* (2013.01); *G05B 2219/34292* (2013.01)

(58) Field of Classification Search
CPC ........ G08C 19/00; G08C 19/02; G08C 19/16; G01L 9/00; G01D 3/10; H04Q 9/00; G05B 2219/3492
See application file for complete search history.

(56) References Cited

U.S. PATENT DOCUMENTS

| | | | | |
|---|---|---|---|---|
| 3,717,858 A | * | 2/1973 | Hadden | .................. G08C 19/26 |
| | | | | 323/224 |
| 4,198,621 A | | 4/1980 | Roper | |
| 4,742,574 A | * | 5/1988 | Smith | ..................... G08C 19/02 |
| | | | | 250/214 A |
| 5,245,333 A | | 9/1993 | Anderson et al. | |
| 5,479,329 A | * | 12/1995 | Motonobu | ............. G01R 31/42 |
| | | | | 363/15 |
| 5,563,587 A | * | 10/1996 | Harjani | ............... H03F 3/45928 |
| | | | | 330/9 |
| 2016/0222892 A1 | * | 8/2016 | Akazaki | ................ F02D 35/023 |

FOREIGN PATENT DOCUMENTS

| | | | | | |
|---|---|---|---|---|---|
| JP | | 03118418 A | * | 5/1991 | ............. G01D 5/245 |
| JP | | 7-110275 A | | 4/1995 | |
| JP | | 9-81883 A | | 3/1997 | |
| JP | | 2013064699 A | * | 4/2013 | ............... G01L 9/00 |

* cited by examiner

*Primary Examiner* — Nguyen Ha
(74) *Attorney, Agent, or Firm* — Sughrue Mion, PLLC

(57) ABSTRACT

A field device includes a detected signal converter configured to convert a detected signal of a sensor into a predetermined voltage and then to output the voltage, an amplifier configured to amplify an output signal of the detected signal converter, and a switching power supply as an internal driving power supply of the field device.

4 Claims, 2 Drawing Sheets

FIELD DEVICE

CROSS-REFERENCE TO RELATED APPLICATION

The present application claims priority from Japanese Patent Application No. 2014-210652 filed on Oct. 15, 2014, the entire content of which is incorporated herein by reference.

BACKGROUND

Technical Field

The present invention relates to a field device and in particular to a field device configured to convert a detected signal of a sensor into a predetermined voltage and then to output the voltage.

Related Art

Field devices are field installation instruments in process control systems and various types thereof are employed. As one type of field devices, a voltage output type transmitter which is configured to be operated at a lower current and thus has a lower power consumption is known.

FIG. 4 is a block diagram showing an example of a related-art voltage output type transmitter T. An analog output signal of a sensor 1 is inputted to a measurement control unit 2 to be subjected to a digital calculation processing for normalizing the signal to a predetermined range of voltage (1-5V), which is standardized by international organizations, and then is inputted to a D/A converter 3 to be again converted into an analog signal of 1-5V.

Also, the measurement control unit 2 is constituted of an A/D converter 21 for converting the analog output signal of the sensor 1 into a digital signal, a CPU 22 for generally controlling operations of the measurement control unit 2, and a modem 23 for communicating a signal with the external device.

The analog signal of 1-5V converted and outputted from the D/A converter 3 is outputted as an output signal to the external device through an amplifier 4 and a noise filter 5. Also, the noise filter 5 is configured to obtain a desired noise elimination characteristic by combining an inductance, a capacitor, a resistor and the like, but only a resistor is shown in the figure.

A linear regulated power supply 6 stabilizes an output voltage of a DC power supply 7 to a predetermined driving voltage depending on each part and then supplies the voltage to each part. A voltmeter 8 measures and monitors an output voltage of the amplifier 4.

According to the configuration of FIG. 4, it is not necessary to output a current signal of 4-20 mA, because the voltage is outputted. Accordingly, the transmitter T is operated only at a current of about 3 mA required in itself, thereby achieving a lower power consumption.

In Patent Document 1, a configuration of a three-wire low power transmitter is described.

[Patent Document 1] U.S. Pat. No. 5,245,333

As described above, the related-art low' power transmitter T shown in FIG. 4 employs the general linear regulated power supply 6 as a power supply for supplying a driving voltage to each internal part of the device, and thus is configured to consume a constant current regardless whether a power supply voltage supplied to a primary side thereof is high or low.

Therefore, the current of about 3 mA required in the transmitter can be stably supplied to a secondary side, but because the constant current is always consumed, efficiency in terms of power consumption becomes poor if a primary-side voltage is high.

In order to prevent this, mounting a switching power supply instead of the linear regulated power supply 6 could be conceived.

Herein, because an operation current of the linear regulated power supply is determined by a secondary-side output current, the operation current is not changed even if the primary-side voltage is varied and thus an input impedance considered on the primary side is high.

On the other hand, the switching power supply is operated so that an operation current I thereof is decreased when the primary-side power supply voltage is high and increased when the primary-side power supply voltage is low. Namely, because the operation current I is changed depending on the power supply voltage, it seems that the input impedance considered on the primary side is lower as compared to the linear regulated power supply.

Also, the switching power supply is configured to transmit energy by switching the input voltage, but in order to prevent the input voltage from being significantly varied due to such switching operations, the input impedance thereof has to be decreased by incorporating a capacitor having a large capacitance or the like.

In this way, when the linear regulated power supply is substituted with the switching power supply, the input impedance of the primary-side power supply part is decreased. In addition, because a signal output of the transmitter having an output of 1-5V has a low impedance, it can be considered that a noise N from the exterior is intruded into the internal of the device to cause misoperation thereof.

In order to prevent this, for example, a filter or the like is arranged on the output part for the purpose of eliminating the noise.

However, in the low power transmitter T shown in FIG. 4, a ground wiring G are shared for the power supply and output voltages. As a result, an error voltage caused by a resistance component of the noise filter 5 provided on the grounding wiring G and the operation current I flowing through the resistance component is generated, thereby decreasing accuracy of the output voltage.

Also, in terms of the amplifier 4, an output of the amplifier 4 employs a common potential point as a reference. Therefore, if the error voltage exists in the ground wiring G, the reference for the output voltage becomes wrong, and as a result, a voltage measured by the voltmeter 8 includes an error.

SUMMARY

Exemplary embodiments of the invention provide a field device having a lower power consumption and a higher noise rejection performance.

A field device according to a first aspect of the invention comprises:

a detected signal converter configured to convert a detected signal of a sensor into a predetermined voltage and then to output the voltage;

an amplifier configured to amplify a output signal of the detected signal converter; and a switching power supply as an internal driving power supply of the field device.

A field device according to a second aspect of the invention comprises:

a detected signal converter configured to convert a detected signal of a sensor into a predetermined voltage and then to output the voltage;

an amplifier configured to amplify a output signal of the detected signal converter; and a noise filter, wherein the detected signal converter is configured to set a primary-side voltage of the noise filter as a reference voltage.

A field device according to a third aspect of the invention comprises:

a detected signal converter configured to convert a detected signal of a sensor into a predetermined voltage and then to output the voltage;

an amplifier configured to amplify a output signal of the detected signal converter;

a switching power supply as an internal driving power supply of the field device; and a noise filter, wherein the amplifier is configured to set a primary-side voltage of the noise filter as a reference voltage.

The field device may be a pressure transmitter.

Accordingly, the field device having a lower power consumption and a higher noise rejection performance can be realized.

DETAILED DESCRIPTION

Figure 1:
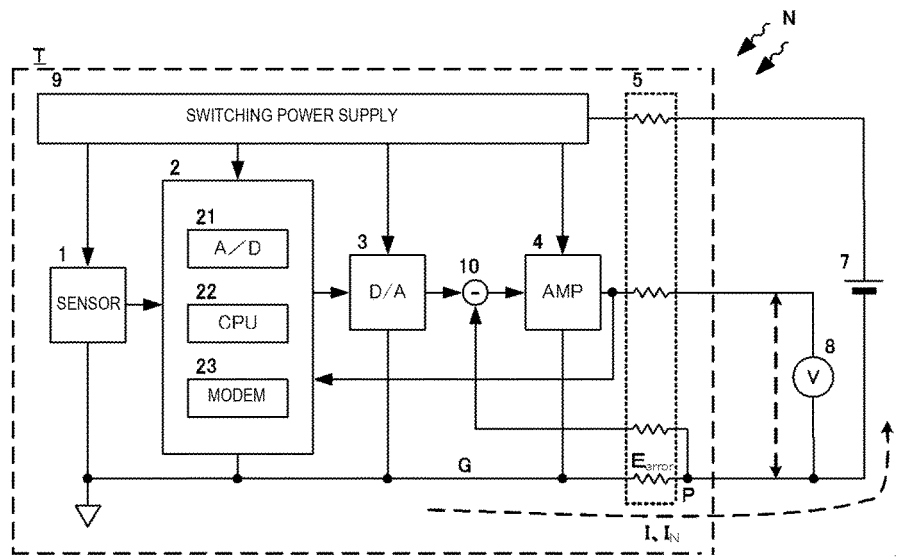
FIG. 1 is a block diagram showing a voltage output type transmitter according to an embodiment of the present invention.
Figure 4:
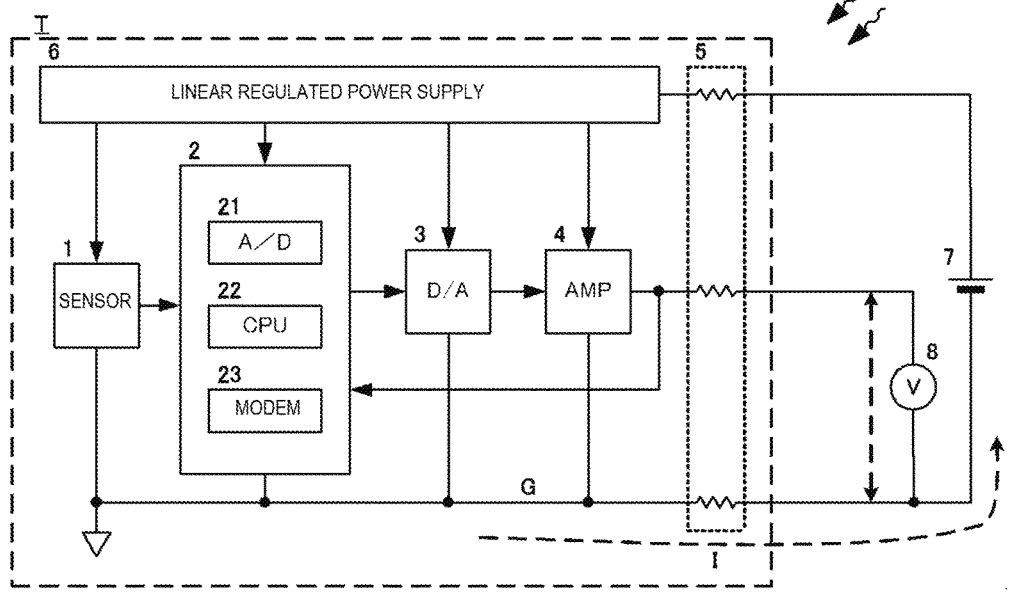
FIG. 4 is a block diagram showing an example of a related-art voltage output type transmitter.

The present invention will be now described in detail with reference to the accompanying drawings. FIG. 1 is a block diagram showing a voltage output type transmitter according to an embodiment of the present invention, wherein the same parts as those in FIG. 4 are designated by the same reference numerals. As the voltage output type transmitter, a pressure transmitter having a pressure sensor is used, for example. In FIG. 1, a switching power supply 9 is provided instead of the linear regulated power supply 6 used as a power supply for supplying a driving voltage to each internal part of the device in the circuit configuration of FIG. 4.

A subtractor 10 is connected to a D/A converter 3 and an amplifier 4. An output terminal of the D/A converter 3 is connected to one input terminal of the subtractor 10. A connection point P between a noise filter 5 on a ground wiring G, a voltmeter 8 and a minus terminal of a DC power supply 7 is connected to the other input terminal thereof.

In this configuration, the switching power supply 9 is operated so that an operation current I is decreased when a primary-side power supply voltage is high and the operation current I is increased when the power supply voltage is low. Namely, the switching power supply is operated so that power consumption is kept substantially constant even if the primary-side power supply voltage is varied.

Because the operation current I is varied depending on the power supply voltage by using the switching power supply 9, it seems that an input impedance to a transmitter is lower as compared to the related-art example shown in FIG. 4.

As a result, a noise N is intruded from the exterior to flow as a noise current $I_N$ in the ground wiring G, so that the operation current I is changed to generate an error voltage $E_{error}$.

However, according to the circuit configuration of FIG. 1, the error voltage $E_{error}$ is subtracted from the output voltage of the D/A converter 3 by the subtractor 10, so that an influence of the error voltage $E_{error}$ is compensated and a correct voltage in which the influence of the error voltage $E_{error}$ is compensated is outputted to the voltmeter 8.

Because the switching power supply 9 is mounted as an internal driving power supply of a voltage output type field device, which is configured to convert an detected signal of a sensor 1 into a predetermined voltage and then to output the voltage, the field device can be operated with a lower power consumption as compared to the related-art configuration shown in FIG. 4, even if a voltage of the DC power supply 7 is high.

Also, by providing the subtractor 10 serving to correct the influence of the error voltage $E_{error}$, the correct output voltage can be obtained even if the noise filter 5 is employed.

In the related art, from the point of view that a sufficient noise rejection performance cannot be ensured, the switching power supply has never been mounted as the internal driving power supply of the voltage output type field device, but this can be realized owing to the circuit configuration as in the present invention.

Figure 2:
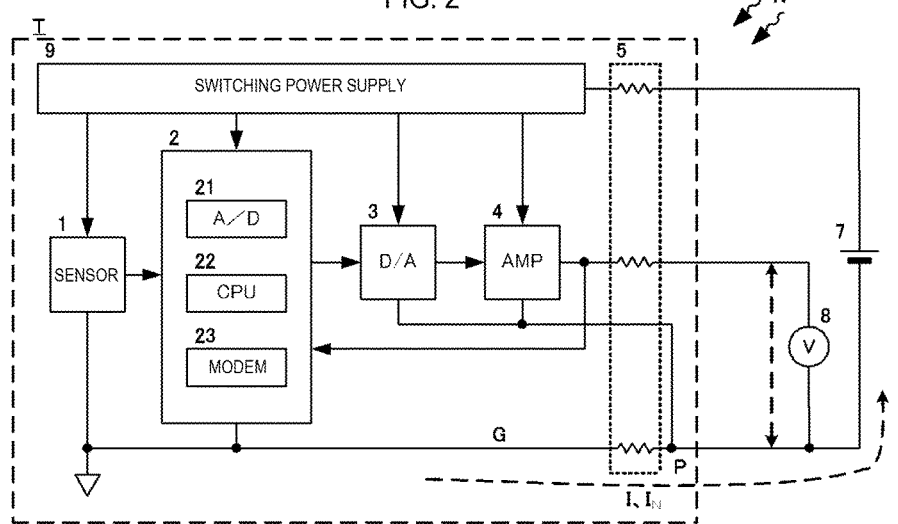
FIG. 2 is a block diagram showing a voltage output type transmitter according to another embodiment of the present invention.

FIG. 2 is a block diagram showing a voltage output type transmitter according to another embodiment of the present invention, wherein the same parts as those in FIG. 1 are designated by the same reference numerals. Differences between FIGS. 1 and 2 are in that a primary-side voltage of the noise filter 5 is used as a reference voltage. More specifically, the subtractor 10 in FIG. 1 is not required in FIG. 2 and also the connection point P between the noise filter 5 on the ground wiring G, the voltmeter 8 and the minus terminal of the DC power supply 7 is connected as a reference voltage of the D/A converter 3 and the amplifier 4.

According to the configuration of FIG. 2, the reference voltage of the amplifier 4 is not influenced by the error voltage $E_{error}$, and like the configuration of the FIG. 1, a correct voltage which is not influenced by the error voltage $E_{error}$ is outputted to the voltmeter 8.

In addition, according to the configuration of FIG. 2, the subtractor 10 of FIG. 1 is not required, thereby obtaining the effect of reducing the number of parts as compared to the configuration of FIG. 1.

Figure 3:
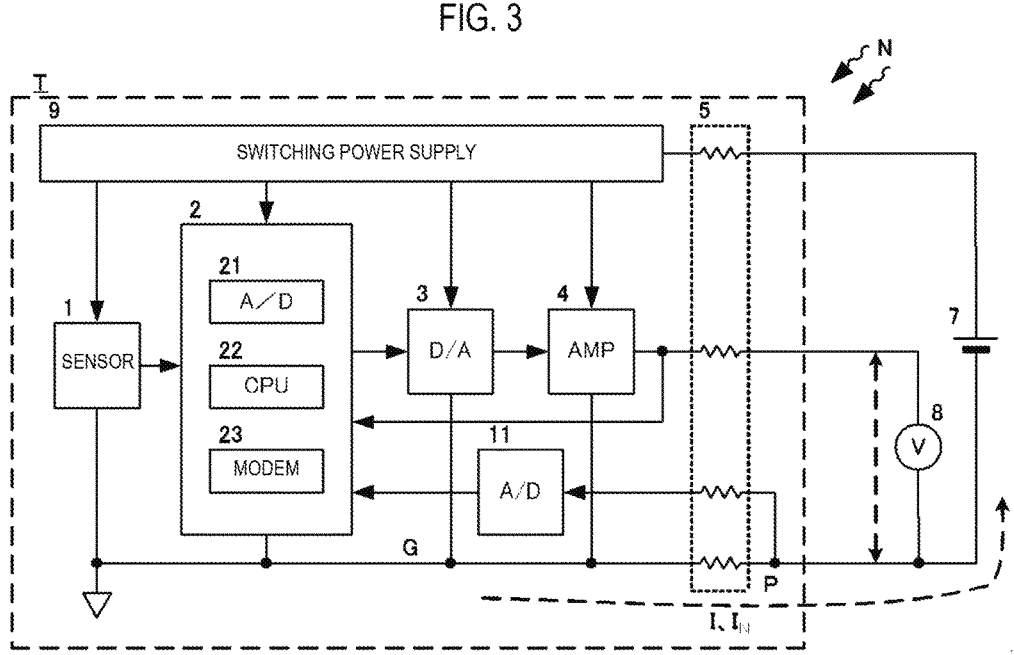
FIG. 3 is a block diagram showing a voltage output type transmitter according to further another embodiment of the present invention.

FIG. 3 is a block diagram showing a voltage output type transmitter according to further another embodiment of the present invention, wherein the same parts as those in FIG. 1 are designated by the same reference numerals. Differences between FIGS. 1 and 3 are in that the subtractor 10 in FIG. 1 is not required in FIG. 3 and also the error voltage $E_{error}$ at the connection point P between the noise filter 5 on the ground wiring G, the voltmeter 8 and the minus terminal of the DC power supply 7 is converted into a digital signal by an A/D converter 11 and then fed back to a measurement control unit 2.

The measurement control unit 2 performs the calculation of subtracting a value of the error voltage $E_{error}$, which is fed back as the digital signal through the A/D converter 11, from a set value of the D/A converter 3.

According to the configuration of FIG. 3, a voltage output transmitter in which noise rejection performance and output accuracy are compatible with each other can be realized like the configurations of FIGS. 1 and 2.

Also, although in each of the foregoing embodiments, the voltage output type transmitter as the field device is described by way of example, the field device is not limited to the transmitter, and for example, may be a flow meter.

As described above, according to the present invention, a field device having a lower power consumption and a higher noise rejection performance can be realized.

What is claimed is:

1. A field device comprising:
   a detected signal converter configured to convert a detected signal of a sensor into a predetermined voltage and then to output the voltage;
   an amplifier configured to amplify an output signal of the detected signal converter; and
   a noise filter,
   wherein the detected signal converter is configured to set a primary-side voltage of the noise filter as a reference voltage.

2. A field device comprising:
   a detected signal converter configured to convert a detected signal of a sensor into a predetermined voltage and then to output the voltage;
   an amplifier configured to amplify an output signal of the detected signal converter;
   a switching power supply as an internal driving power supply of the field device; and
   a noise filter,
   wherein the amplifier is configured to set a primary-side voltage of the noise filter as a reference voltage.

3. The field device according to claim 1, wherein the field device is a pressure transmitter.

4. The field device according to claim 2, wherein the field device is a pressure transmitter.

* * * * *